United States Patent
Thomas

(10) Patent No.: US 9,822,992 B2
(45) Date of Patent: Nov. 21, 2017

(54) SOLAR OVEN

(71) Applicant: Sharlene Judith Thomas, Willow Spring, NC (US)

(72) Inventor: Sharlene Judith Thomas, Willow Spring, NC (US)

( * ) Notice: Subject to any disclaimer, the term of this patent is extended or adjusted under 35 U.S.C. 154(b) by 280 days.

(21) Appl. No.: 13/901,431

(22) Filed: May 23, 2013

(65) Prior Publication Data

US 2014/0345601 A1    Nov. 27, 2014

(51) Int. Cl.
    *C12Q 1/68*     (2006.01)
    *F24J 2/02*     (2006.01)
    *G06F 19/22*    (2011.01)

(52) U.S. Cl.
    CPC ............. *F24J 2/02* (2013.01); *Y02B 40/18* (2013.01); *Y02E 10/40* (2013.01)

(58) Field of Classification Search
    CPC ............. F24J 2/02; Y02B 40/18; Y02E 10/40
    USPC ................ 126/451, 25 R, 681; D07/354
    See application file for complete search history.

(56) References Cited

U.S. PATENT DOCUMENTS

| | | | | |
|---|---|---|---|---|
| 5,139,010 | A * | 8/1992 | Borgens et al. | 126/682 |
| 5,499,573 | A * | 3/1996 | Lin | 99/337 |
| 6,557,544 | B2 * | 5/2003 | Sim | 126/25 A |
| 6,845,705 | B1 * | 1/2005 | Chen | 99/340 |
| 2002/0170555 | A1 * | 11/2002 | Stoumen et al. | 126/682 |
| 2006/0289001 | A1 * | 12/2006 | Hopewell | 126/681 |
| 2011/0023868 | A1 * | 2/2011 | Seller | 126/681 |
| 2011/0079210 | A1 * | 4/2011 | Jackovitch | 126/25 R |

OTHER PUBLICATIONS

"Browne Foodservice 80120020 10-½ in Folding Loaf Pan." KaTom Restaurant Supply, Inc. N.p., Mar. 18, 2012. Web. May 27, 2015.*

* cited by examiner

*Primary Examiner* — Steven B McAllister
*Assistant Examiner* — Reginald McNeill, II
(74) *Attorney, Agent, or Firm* — Dunlap Bennett & Ludwig PLLC; Brendan E. Squire

(57) ABSTRACT

A solar oven designed for year-round use is readily-accessible and easy to use by simply removing a protective oven cover. The solar oven replicates the mainstream cook's current pattern with standard stoves, requiring little set-up or storage. Access to the solar oven is from the front and solar heat is stored in an upper oven chamber. By changing the solar oven chamber above the door, heat remains in the trapezoidal-pyramid cover during transfers and condensation is reduced to a minimum. By raising and lowering the floor, the solar oven allows the gasketed oven chamber to perform food cooking while being protected to prevent loss of heat. The solar oven remains available in all weather, does not fade in color and is attractive to most mainstream cooks.

11 Claims, 4 Drawing Sheets

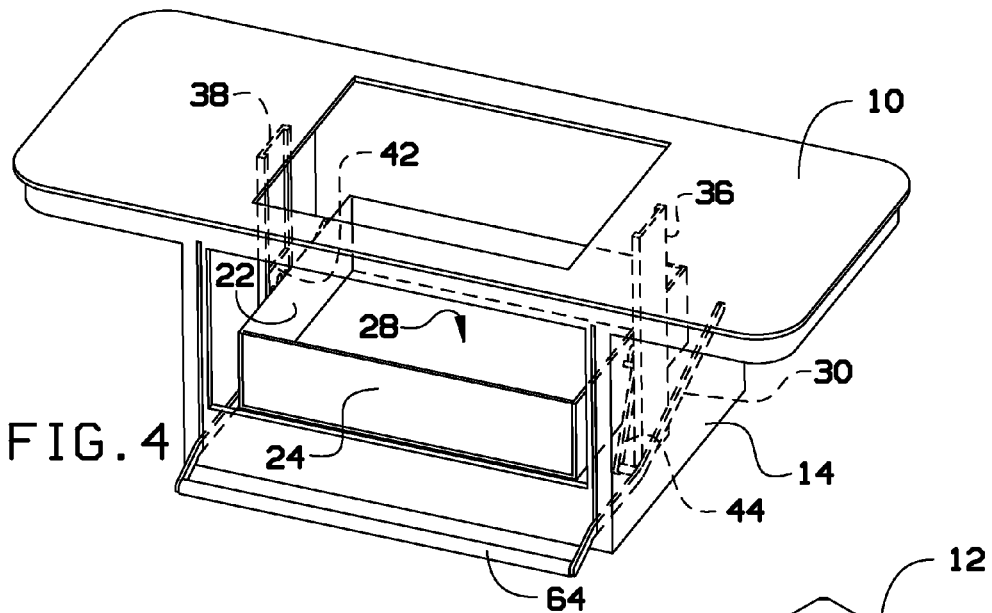
FIG. 4
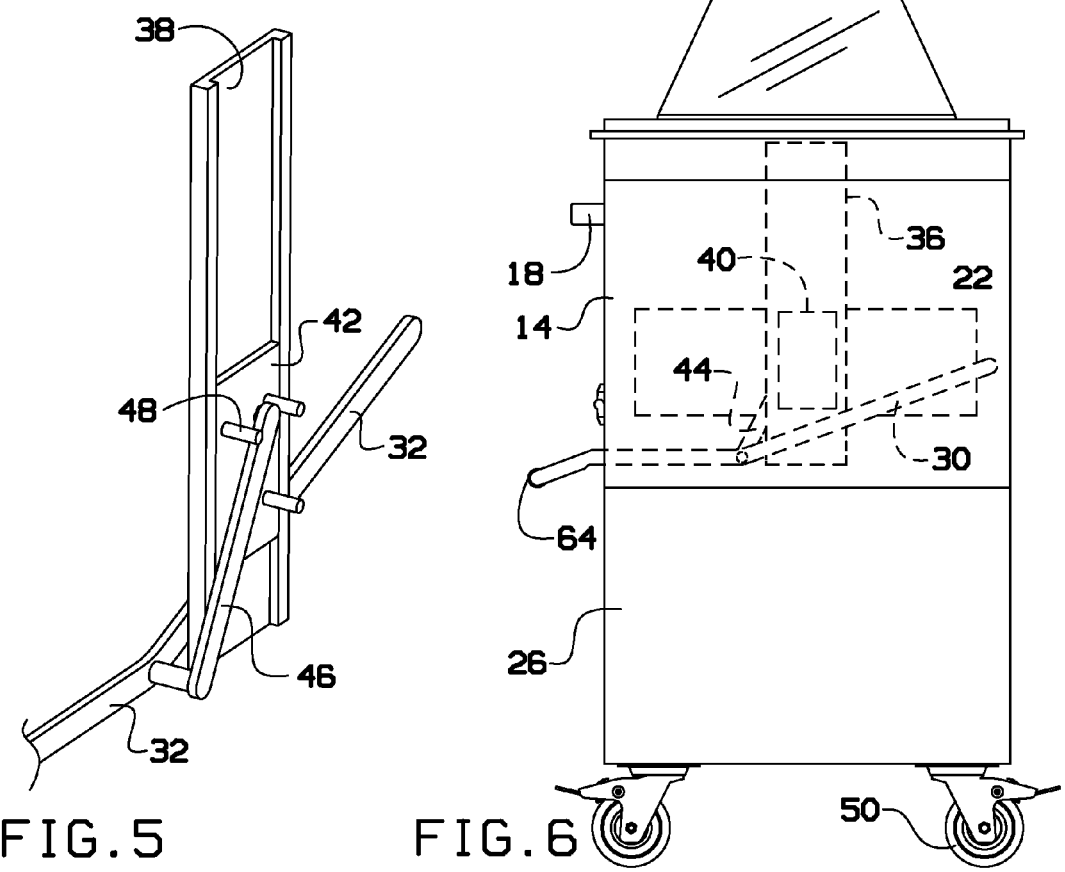
FIG. 5
FIG. 6

SOLAR OVEN

BACKGROUND OF THE INVENTION

The present invention relates to solar ovens and, more particularly, to a solar oven for mainstream use as a tabletop, floor or wall unit.

Current, commercially-built solar ovens perform close to standard ovens temperature-wise, but are built for portability, are small in size and are not weatherized.

The mainstream cook tends not to use appliances that need to be stored between uses. Their small size and need to assemble, tie down, and watch, make current solar ovens incompatible with the mainstream lifestyle. Current solar ovens require attention in high wind, lose heat and cooking time when the door is opened, require wiping of accumulated condensation during the cooking process and need to be stored when not in use.

As can be seen, there is a need for an improved solar oven that addresses many of the issues associated with current conventional solar ovens.

SUMMARY OF THE INVENTION

In one aspect of the present invention, a solar oven comprises a transparent chamber having an open bottom and enclosed sides; a cook tray disposed below the transparent chamber; and a mechanical linkage operable to move the cook tray between a raised cooking position, with the cook tray disposed against the transparent chamber, and a lowered access position, where access to food within the cook tray is available without losing heat out a side access of the transparent chamber.

In another aspect of the present invention, a solar oven comprises a trapezoidal-pyramid dual topped transparent chamber having an open bottom and enclosed sides; a cook tray disposed below the transparent chamber; a cantilever mechanical linkage operable to move the cook tray between a raised cooking position, with the cook tray disposed against the transparent chamber, and a lowered access position, where access to food within the cook tray is available without losing heat out a side access of the transparent chamber; a main oven door providing access to the cook tray when the cook tray is in the lowered access position; and a cook tray door operable to lower at least a portion of one side of the cook tray.

These and other features, aspects and advantages of the present invention will become better understood with reference to the following drawings, description and claims.

BRIEF DESCRIPTION OF THE DRAWINGS

FIG. 4 is a detailed perspective view of the solar oven of FIG. 1, with upper components removed to illustrate the cook tray in a lowered configuration;

FIG. 5 is a detailed perspective view of a cook tray side arm, in a lowered configuration, of the solar oven of FIG. 1;

FIG. 6 is a side view of the solar oven of FIG. 1, illustrating inner components in a lowered configuration;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a solar oven designed for year-round use that is readily-accessible and easy to use by simply removing a protective oven cover. The solar oven replicates the mainstream cook's current pattern with standard stoves, requiring little set-up or storage. Access to the solar oven is from the front and solar heat is stored in an upper oven chamber. By changing the solar oven chamber above the door, heat remains in the trapezoidal-pyramid cover during transfers and condensation is reduced to a minimum. By raising and lowering the floor, the solar oven allows the gasketed oven chamber to perform food cooking while being protected to prevent loss of heat. The solar oven remains available in all weather, does not fade in color and is attractive to most mainstream cooks.

Referring now to FIGS. 1 through 12, a solar oven can include a tabletop 10 resting on a grill upper body/box 14 that is supported on a lower support box 26. Casters 50 can be provided on the lower support box 26 for ease of portability. The solar oven can rest inside a housing defined by the tabletop 10, grill upper body/box 14, and lower support box 26. In some embodiments, the solar oven can be wall mounted, in which case the tabletop 10 may be excluded. In other embodiments, the solar oven can be a "drop-in" style, where the griller upper body/box 14 and the lower support box 26 may not be needed. While the Figures show one style of housing for the solar oven, various other housing styles or designs may be contemplated within the scope of the present invention.

Figure 1:
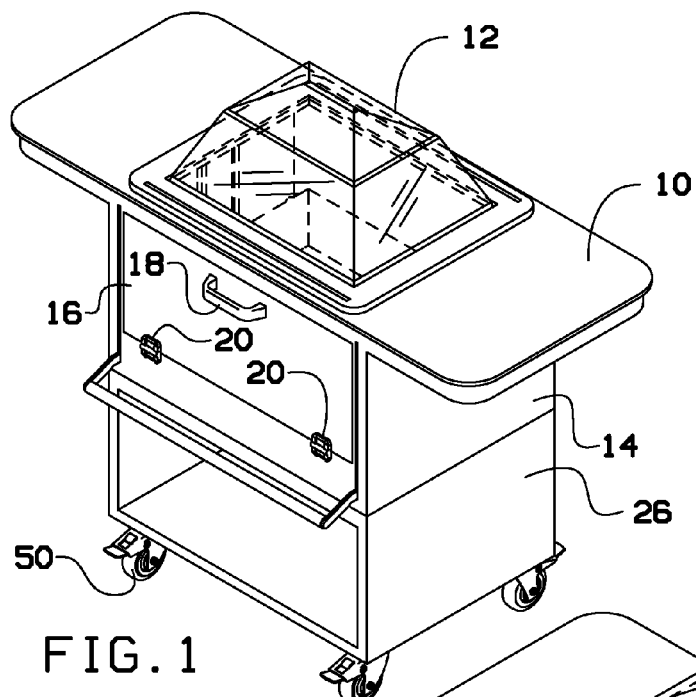
FIG. 1 is a perspective view of a solar oven according to an exemplary embodiment of the present invention.
Figure 2:
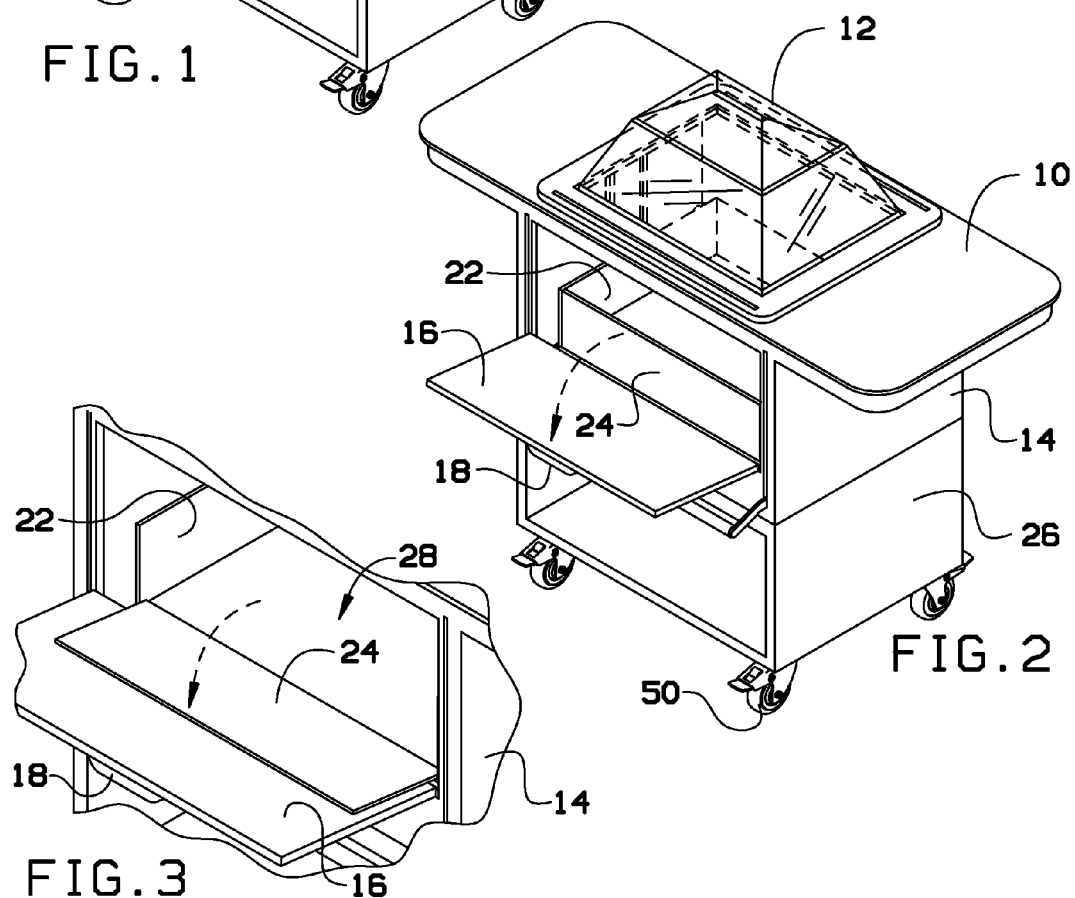
FIG. 2 is a perspective view of the solar oven of FIG. 1, illustrating rotational translation of the main oven door in an open configuration.
Figure 3:
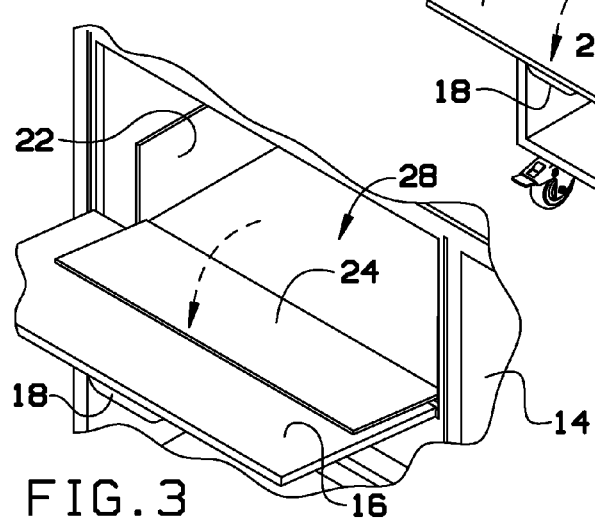
FIG. 3 is a detailed perspective view of the solar oven of FIG. 1, illustrating rotational translation of a cook tray door to provide access to a cook tray.
Figure 7:
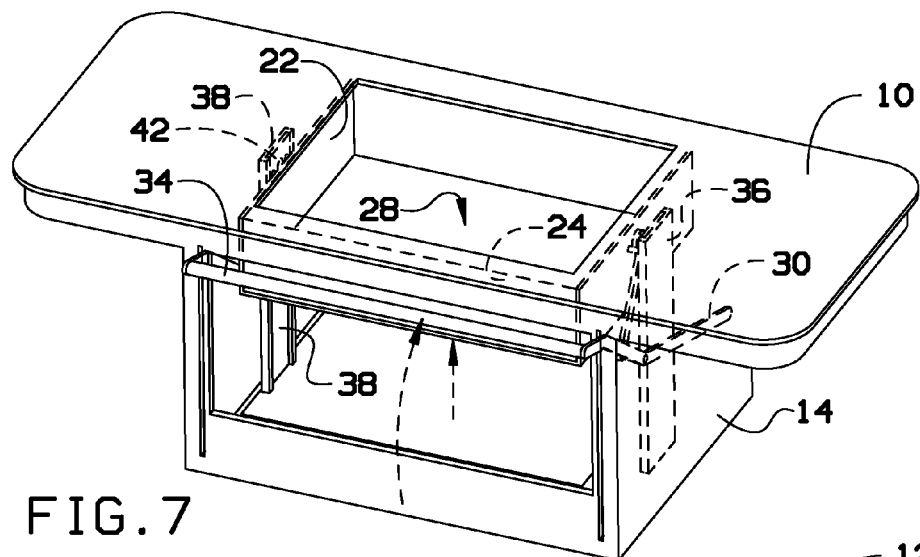
FIG. 7 is a detailed perspective view of the solar oven of FIG. 1, with the upper components removed to illustrate the cook tray in a raised configuration.
Figures 8, 9:
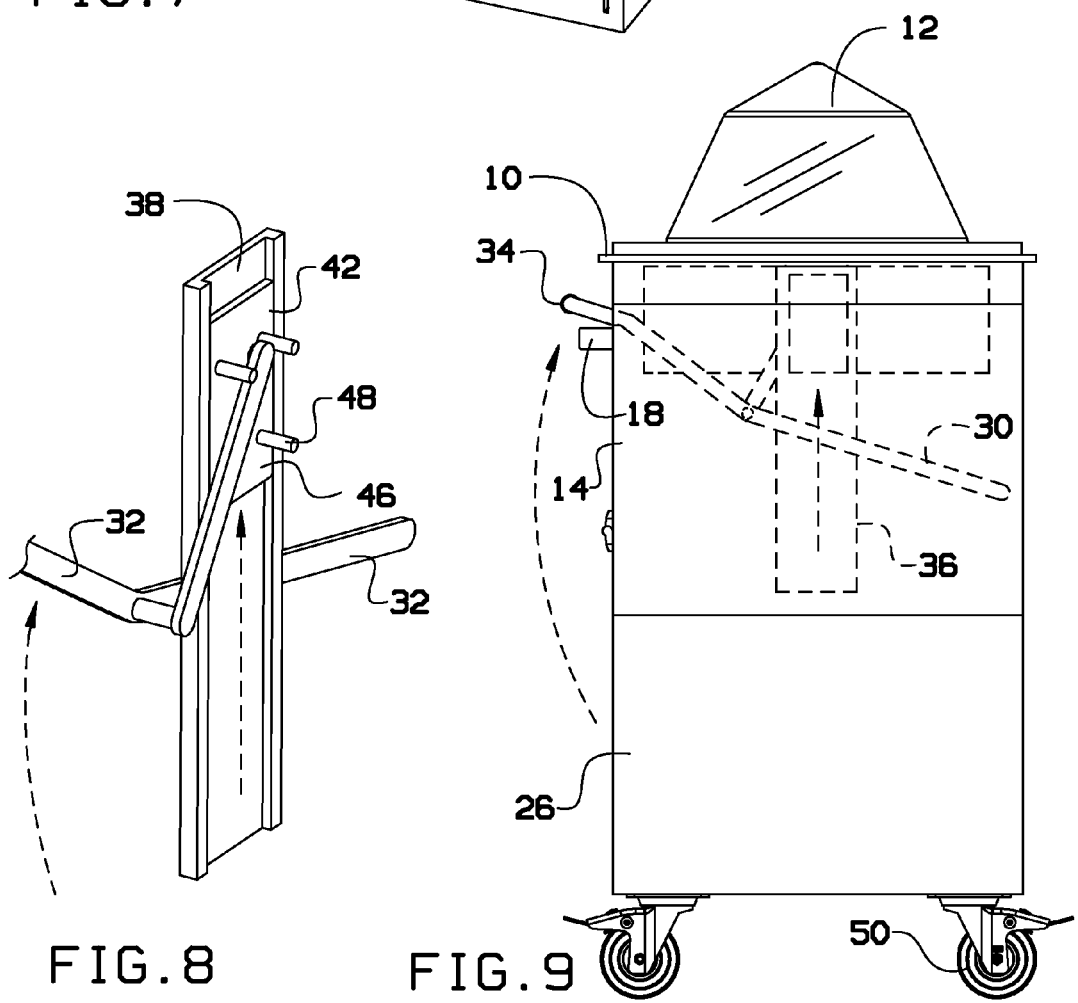
FIG. 8 is a detailed perspective view of a cook tray side arm, in a raised configuration, of the solar oven of FIG. 1.
FIG. 9 is side view of the solar oven of FIG. 1, illustrating inner components in a raised configuration.

The solar oven can include a main oven door 16 with a main oven door handle 18 providing a pull point for a user to open and close the main oven door 16 with hinges 20. With the main oven door 16 open, as shown in FIG. 2, for example, access is provided to a cook tray 22. A cook tray door 24 can pivot down (see FIG. 3) to provide ease of access to the cook tray 22. A food placement surface 28 is provided at the bottom of the cook tray 22 for placement of food, cooking pans, or the like.

The solar oven can include a trapezoidal-pyramid dual topped transparent chamber 12 defining a cooking region of the solar oven. Typically, the transparent chamber 12 includes an outer protective member and an inner cooking region surface spaced apart and inward from the outer protective member by about 0.25 inch, for example. As described below, food placed in the cook tray 22 can be lifted into the transparent chamber 12 for cooking. Because the transparent chamber 12 is disposed above the cook tray 22 and access to food is achieved by lowering the cook tray 22, minimal heat is lost from the transparent chamber 12 when food is lowered for inspection or the like.

In some embodiments, the cook tray 22 can be attached to right and left cook tray rail plates 40, 42 that can be attached to the cook tray 22. Right and left cook tray raise arms 30, 32 can attach to the right and left cook tray rail plates 40, 42 with right and left connector arms 44, 46. Arm-tray connectors 48 can provide a connection between the right and left connector arms 44, 46 and the right and left cook tray rail plates 40, 42. The right and left cook tray rail plates 40, 42 can move within right and left cook tray rails 36, 38, disposed generally vertically on sides of the cook tray 22. A cook tray raise handle 64 (shown as cook tray raise handle 34 when in the raised configuration) can be provided to allow the user to raise the cook tray 22 to a cooking position, where the food is disposed in the transparent chamber 12 and gaskets (not shown) or the like can seal the cook tray 22 with the transparent chamber 12. The resulting linkage mechanism can result in, for example, a mechanical ratio of 1.75 to 1 for raising and lowering the cook tray 22. Of course, other methods of raising and lowering the cook tray 22 are contemplated within the scope of the present invention.

Figure 10:
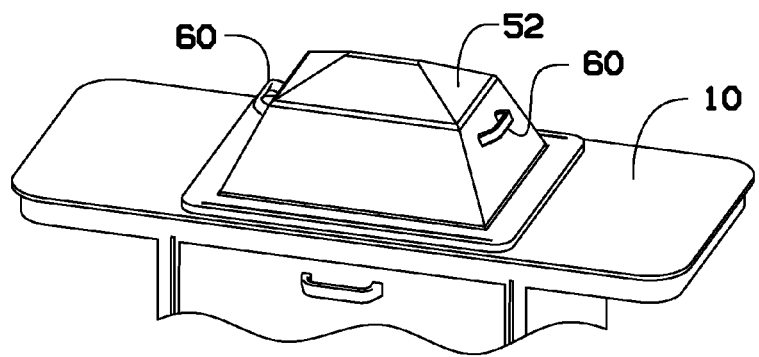
FIG. 10 is a detailed perspective view of the solar oven of FIG. 1 having a dome cover.

In some embodiments, as shown in FIG. 10, a dome cover 52 can be disposed over the transparent chamber 12. Dome cover handles 60 can be provided on the sides of the dome cover 52 to provide ease in placement and removal of the dome cover 52.

Figure 11:
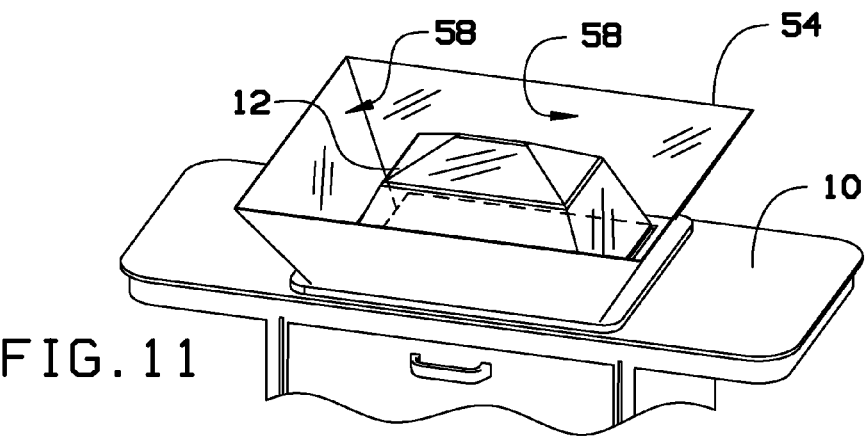
FIG. 11 is a detailed perspective view of the solar oven of FIG. 1 having a reflective four sided cone.
Figure 12:
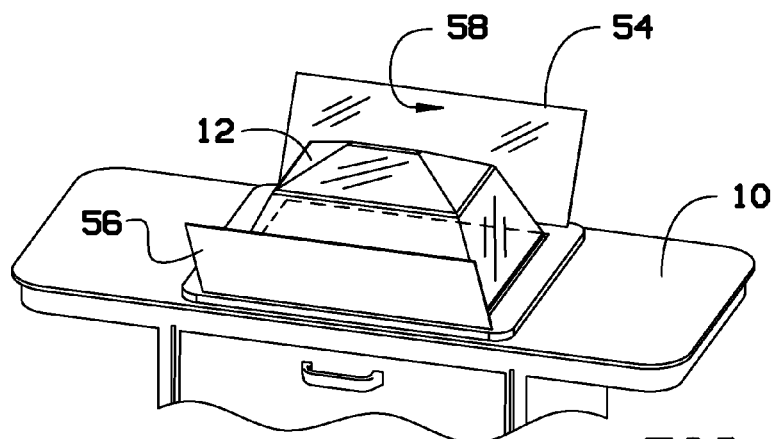
FIG. 12 is a detailed perspective view of the solar oven of FIG. 1 having single reflective plates.

In some embodiments, various reflective plates can be provided to direct solar energy to the transparent chamber 12. For example, as shown in FIG. 11, a reflective four sided cone 54 can be provided to surround the transparent chamber 12 with a reflective surface 58. In other embodiments, as shown in FIG. 12, the four sided cone 54 can have panels 56 removed to provide a one, two (as shown) or three sided reflective plate configuration. The angles of the panels 56 can be designed depending on the time of year, latitude where the solar oven is used, and the like.

It should be understood, of course, that the foregoing relates to exemplary embodiments of the invention and that modifications may be made without departing from the spirit and scope of the invention as set forth in the following claims.

What is claimed is:

1. A solar oven comprising:
    a transparent chamber having an open bottom and enclosed transparent sides;
    a cook tray disposed below the transparent chamber; and
    a mechanical linkage operable to move the cook tray between a raised cooking position, with the cook tray disposed against the open bottom of the transparent chamber, and a lowered access position, where access to food within the cook tray is available while retaining heat within the transparent chamber.

2. The solar oven of claim 1, wherein the transparent chamber is a trapezoidal-pyramid dual topped transparent chamber.

3. The solar oven of claim 1, further comprising a main oven door providing access to the cook tray when the cook tray is in the lowered access position.

4. The solar oven of claim 3, further comprising a main oven door handle providing a pull point to open the main oven door about one or more hinges disposed on one side thereof.

5. The solar oven of claim 1, further comprising a cook tray door operable to lower at least a portion of one side of the cook tray.

6. The solar oven of claim 1, further comprising a dome cover fitting over the transparent chamber.

7. The solar oven of claim 1, further comprising one or more reflective panels disposed along at least one side, at an angle thereto, of the transparent chamber.

8. The solar oven of claim 1, wherein the mechanical linkage is a cantilever system operable to raise and lower the cook tray along a right and a left cook tray rail plate.

9. A solar oven comprising:
    a trapezoidal-pyramid transparent chamber having an open bottom and enclosed transparent sides;
    a cook tray disposed below the transparent chamber;
    a cantilever mechanical linkage operable to move the cook tray between a raised cooking position, with the cook tray disposed against the transparent chamber, and a lowered access position, where access to food within the cook tray is available while retaining heat within the transparent chamber;
    a main oven door providing access to the cook tray when the cook tray is in the lowered access position; and
    a cook tray door operable to lower at least a portion of one side of the cook tray.

10. The solar oven of claim 9, further comprising:
    a dome cover fitting over the transparent chamber; and
    one or more reflective panels disposed along at least one side, at an angle thereto, of the transparent chamber.

11. The solar oven of claim 9, wherein the trapezoidal-pyramid transparent chamber is dual topped.

* * * * *